(12) United States Patent
Miura et al.

(10) Patent No.: US 8,026,007 B2
(45) Date of Patent: Sep. 27, 2011

(54) CROSSLINKED POLYMER ELECTROLYTE AND USE THEREOF

(75) Inventors: Katsuhito Miura, Osaka (JP); Masato Tabuchi, Osaka (JP); Shouhei Matsui, Osaka (JP); Yoshihiko Wada, Osaka (JP)

(73) Assignee: Daiso Co., Ltd., Osaka (JP)

( * ) Notice: Subject to any disclaimer, the term of this patent is extended or adjusted under 35 U.S.C. 154(b) by 889 days.

(21) Appl. No.: 10/561,038

(22) PCT Filed: Jun. 17, 2004

(86) PCT No.: PCT/JP2004/008834
§ 371 (c)(1), (2), (4) Date: Dec. 16, 2005

(87) PCT Pub. No.: WO2004/113443
PCT Pub. Date: Dec. 29, 2004

(65) Prior Publication Data
US 2007/0099089 A1    May 3, 2007

(30) Foreign Application Priority Data

Jun. 19, 2003 (JP) ................................. 2003-175350

(51) Int. Cl.
*H01M 6/18* (2006.01)
(52) U.S. Cl. ........ 429/307; 429/188; 429/192; 429/303; 429/317
(58) Field of Classification Search ................. 429/303, 429/188, 192, 307, 317
See application file for complete search history.

(56) References Cited

U.S. PATENT DOCUMENTS

| | | | |
|---|---|---|---|
| 4,818,644 A | 4/1989 | Armand | |
| 5,837,157 A * | 11/1998 | Kohjiya et al. | 252/62.2 |
| 5,968,681 A | 10/1999 | Miura et al. | |
| 6,159,389 A * | 12/2000 | Miura et al. | 252/62.2 |
| 6,159,638 A * | 12/2000 | Takatera et al. | 429/309 |
| 2003/0124432 A1 * | 7/2003 | Miura et al. | 429/317 |

FOREIGN PATENT DOCUMENTS

| | | |
|---|---|---|
| EP | 0 222 586 A2 | 5/1987 |
| EP | 0 742 563 A1 | 11/1996 |
| EP | 0 994 143 B1 | 2/2004 |
| JP | 62-169823 | 7/1987 |
| JP | 63-154736 | 6/1988 |
| JP | 7-296822 | 11/1995 |
| JP | 9-324114 | 12/1997 |
| JP | 10-130487 | 5/1998 |
| JP | 10-176105 | 6/1998 |
| JP | 10-204172 | 8/1998 |
| JP | 11-214038 | 8/1999 |
| JP | 11-269263 | 10/1999 |
| JP | 2000-123632 | 4/2000 |
| JP | 2003-321541 | 11/2003 |
| JP | 2004-119343 | 4/2004 |

* cited by examiner

Primary Examiner — Patrick Ryan
Assistant Examiner — Ben Lewis
(74) Attorney, Agent, or Firm — Wenderoth, Lind & Ponack, L.L.P.

(57) ABSTRACT

A polymer electrolyte composition characterized by comprising: (1) a crosslinked material of a polyether binary copolymer which has a main chain comprising repeating units represented by the formula (i) and crosslinking units represented by the formula (ii) and which has a weight-average molecular weight of $10^4$ to $10^7$, (2) an electrolyte solution comprising an aprotic organic solvent, (3) an additive, as an optical ingredient, which comprises an ether compound having an ethylene oxide unit, and (4) an electrolyte salt compound comprising a lithium salt compound. The composition is excellent in liquid retention and ionic conductivity, is usable in a wide temperature range, and has excellent electrochemical properties.

8 Claims, No Drawings

CROSSLINKED POLYMER ELECTROLYTE AND USE THEREOF

FIELD OF THE INVENTION

The present invention relates to a polymer electrolyte composition comprising a crosslinked material of a polyether binary copolymer. More particularly, the present invention relates to a polymer electrolyte composition which is suitable as a material for an electrochemical device such as a battery, a capacitor, a sensor, a condenser and a photo-electronic conversion element, and an antistatic agent for rubbers and plastics.

BACKGROUND ARTS

As an electrolyte constituting an electrochemical device such as a battery, a capacitor and a sensor, an electrolyte solution or a polymer electrolyte in the form of a gel containing the electrolyte solution has hitherto been used in view of the ionic conductivity. However, pointed out are problems, for example, that there is a fear of damage of an apparatus arising due to liquid leakage of the electrolyte solution and that the electrolyte cannot be used at high temperature in view of safety. To the contrary, a solid electrolyte such as an inorganic crystalline substance, inorganic glass, and an organic polymer substance is suggested. The organic polymer substance is generally superior in processability and moldability and the resulting solid electrolyte has good flexibility and bending processability and, furthermore, the design freedom of the device to be applied is high and, therefore, the development thereof is expected. However, the organic polymer substance is inferior in ionic conductivity to other materials at present.

The discovery of ionic conductivity in a homopolymer of ethylene oxide and an alkaline metal system causes the active researches of a polymer solid electrolyte. Consequently, it is believed that a polyether such as polyethylene oxide is promising as a polymer matrix in view of high mobility and solubility of metal cation. It is expected that the ion migrates in an amorphous portion of the polymer other than a crystalline portion of the polymer. In order to decrease the crystallinity of polyethylene oxide, various epoxides are copolymerized with ethylene oxide. U.S. Pat. No. 4,818,644 discloses a solid electrolyte comprising a copolymer of ethylene oxide and methyl glycidyl ether. However, the solid electrolyte does not always have satisfactory ionic conductivity. As a measure for solving such problem, developed is a battery which comprises gel polymer solid electrolyte comprising an electrolyte solution and polyethyleneglycol diacrylate. In this battery, a reactive monomer having low molecular weight of a few hundreds to a few thousands is reacted, and it is difficult to completely conduct the reaction. The presence of unreacted polyethyleneglycol diacrylate in the battery has the disadvantage that the properties of the battery are significantly deteriorated (JP-A-11-214038). Disadvantageously, the thermal stability is poor and the properties of battery are deteriorated, in the case that the batteries comprising the gel polymer solid electrolyte containing an electrolyte solution, which have been practically used are operated at a high temperature. Accordingly, the upper limit of use has been limited to about 50° C.

JP-A-9-324114 proposes an attempt to use a polymer solid electrolyte in which a specified alkaline metal salt is incorporated into a crosslinked material of high molecular weight diethyleneglycol methyl glycidyl ether/ethylene oxide crosslinked material. However, this electrolyte cannot give a practically sufficient value of conductivity.

DISCLOSURE OF THE INVENTION

An object of the present invention is to provide an electrolyte composition which is excellent in liquid retainability and ionic conductivity, and have wide use temperature range and excellent electrochemical properties.

The present invention provides a polymer electrolyte composition characterized by comprising:

(1) a crosslinked material of a polyether binary copolymer which has a main chain comprising repeating units of the formula (i) and crosslinking units of the formula (ii) and which has a weight-average molecular weight of $10^4$ to $10^7$, (2) an electrolyte solution comprising an aprotic organic solvent, (3) an additive, as an optical ingredient, which comprises an ether compound having an ethylene oxide unit, and (4) an electrolyte salt compound comprising a lithium salt compound.

Additionally, the present invention provides a battery comprising the above-mentioned polymer electrolyte composition.

The crosslinked material (1) of the polyether binary copolymer is preferably a crosslinked material comprising a binary copolymer consisting of the repeating units of the following formula (i) and crosslinkable repeating units of the following formula (ii).

wherein $R^1$ is an ethylenically unsaturated group having an ester linkage.

A monomer constituting the repeating units (i) in the crosslinked material (1) of the polyether binary copolymer is ethylene oxide.

A monomer constituting the crosslinkable repeating units (ii) in the crosslinked material (1) of the polyether binary copolymer is an oxirane compound having an ethylenically unsaturated group having an ester linkage.

The monomer constituting the repeating units (ii) having an ethylenically unsaturated group having an ester linkage is a compound having an ester linkage [that is, —C(=O)O—], a carbon-carbon double bond (that is, C=C) and an oxirane group. In the monomer constituting the repeating units (ii) having an ethylenically unsaturated group having an ester linkage, preferably, the number of ester group is 1, the number of the carbon-carbon double bond is at least 1 (for example, 1 or 2) and the number of the oxirane group is 1.

A monomer having an ethylenically unsaturated group having an ester linkage (ii) may be a compound of the formula:

wherein $A^{11}$ is a hydrocarbon group having 1 to 12 carbon atoms (for example, an aliphatic hydrocarbon group 1 to 12 carbon atoms or an aromatic hydrocarbon group having 1 to 12 carbon atoms), $A^{12}$ is a hydrogen atom or a methyl group, $A^{13}$ a group having an oxirane group, and p is the number of 0 or 1.

The group having an oxirane group is preferably a glycidyl group. Example of the ethylenically unsaturated group having an ester linkage are as follows:

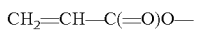

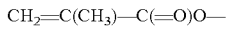

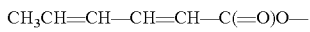

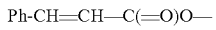

wherein Ph is a phenyl group.

Example of the monomer having the ethylenically unsaturated group having an ester linkage (ii) include glycidyl acrylate, glycidyl methacrylate, glycidyl sorbate, glycidyl cinnamate, and glycidyl crotonate. Glycidyl acrylate and glycidyl methacrylate are preferable.

The polymerization method of the polyether binary copolymer having the ether linkage is a polymerization method for preparing a binary copolymer by a ring-opening reaction of ethylene oxide moiety, and can be conducted in the same method as in JP-A-63-154736 and JP-A-62-169823.

The polymerization reaction can be conducted as follows. The polyether copolymer can be obtained by reacting the respective monomers at the reaction temperature of 10 to 80° C. under stirring, using a catalyst mainly containing an organoaluminum, a catalyst mainly containing an organozinc, an organotin-phosphate ester condensate catalyst and the like as a ring opening polymerization catalyst in the presence or absence of a solvent. The organotin-phosphate ester condensate catalyst is particularly preferable in view of the polymerization degree or properties of the resulting copolymer. In the polymerization reaction, the ethylenically unsaturated group having an ester linkage does not react and a polyether binary copolymer having the ethylenically unsaturated group having an ester linkage is obtained.

The amount of the ethylene oxide constituting the repeating unit (i) may be from 80 to 99.5 mol %, preferably from 90 to 98 mol %, the amount of the oxirane compound constituting the repeating unit (ii) may be from 0.5 to 20 mol %, preferably 2 to 10 mol %, based on the polyether binary copolymer having the ether linkage used in the electrolyte composition of the present invention. The polyether binary copolymer preferably has a random structure.

When the amount of the oxirane compound constituting the crosslinkable repeating unit (ii) is at most 20 mol %, the crosslinked polyether binary copolymer has excellent ionic conductivity.

When the amount of ethylene oxide constituting the repeating unit (i) is at least 80 mol %, the electrolyte salt compound can be easily dissolved even at a low temperature so that the ionic conductivity is high. However, if said amount is larger than 99.5 mol %, the leakage of the aprotic organic solvent is caused after the crosslinking reaction, and there is a problem of lack of safety. It was found that the improvement effect of the ionic conductivity is remarkably high in the case of the polymer electrolyte composition of the present invention.

As the molecular weight of the polymer used in the polymer electrolyte composition, the weight-average molecular weight is suitably within the range from $10^4$ to $10^7$, preferably from $10^5$ to $5 \times 10^6$, so as to obtain excellent processability, moldability, mechanical strength and flexibility.

In the method of crosslinking the binary copolymer having the ethylenically unsaturated group, a radical initiator selected from an organic peroxide, an azo compound and the like, or active energy ray such as ultraviolet ray and electron ray is used. It is also possible to use a crosslinking agent having silicon hydride.

As the organic peroxide, there can be used those which are normally used in the crosslinking, such as ketone peroxide, peroxy ketal, hydroperoxide, dialkyl peroxide, diacyl peroxide and peroxy ester. Specific examples thereof include 1,1-bis(t-butylperoxy)-3,3,5-trimethylcyclohexane, di-t-butyl peroxide, t-butylcumyl peroxide, dicumyl peroxide, 2,5-dimethyl-2,5-di(t-butylperoxy)hexane and benzoylperoxide. The amount of the organic peroxide varies depending on the type of the organic peroxide, but it is normally within the range from 0.1 to 10 parts by weight, based on 100 parts by weight of the electrolyte composition excluding the electrolyte solution (2) and the additive (3).

As the azo compound, there can be used those which are normally used in the crosslinking, such as an azonitrile compound, an azoamide compound and an azoamidine compound, and specific examples thereof include 2,2'-azobisisobutyronitrile, 2,2'-azobis(2-methylbutyronitrile), 2,2'-azobis(4-methoxy-2,4-dimethylvaleronitrile), 2,2-azobis(2-methyl-N-phenylpropionamidine)dihydrochloride, 2,2'-azobis[2-(2-imidazolin-2-yl)propane], 2,2'-azobis[2-methyl-N-(2-hydroxyethyl)propionamide], 2,2'-azobis(2-methylpropane) and 2,2'-azobis[2-(hydroxymethyl) propionitrile]. The amount of the azo compound varies depending on the type of the azo compound, but is normally within the range from 0.1 to 10 parts by weight, based on 100 parts by weight of the polymer electrolyte composition excluding the electrolyte solution (2) and the additive (3).

In the crosslinking due to radiation of activated energy ray such as ultraviolet ray, glycidyl acrylate ether, glycidyl methacrylate ether and allyl glycidyl ether are particularly preferable. Furthermore, as a sensitizer, there can be optionally used acetophenones such as diethoxyacetophenone, 2-hydroxy-2-methyl-1-phenylpropan-1-one and phenylketone; benzoin; benzoin ethers such as benzoin methyl ether; benzophenones such as benzophenone and 4-phenylbenzophenone; thioxanthones such as 2-isopropylthioxanthone and 2,4-dimethylthioxanthone; and azides such as 3-sulfonylazidobenzoic acid and 4-sulfonylazidobenzoic acid.

As a crosslinking accelerator, there can be optionally used ethylene glycol diacrylate, ethylene glycol dimethacrylate, diethylene glycol diacrylate, diethylene glycol dimethacrylate, triethylene glycol diacrylate, triethylene glycol dimethacrylate, oligoethylene glycol diacrylate, oligoethylene glycol dimethacrylate, propylene glycol diacrylate, propylene glycol dimethacrylate, oligopropylene glycol diacrylate, oligopropylene glycol dimethacrylate, vinyl acrylate, vinyl methacrylate, allyl acrylate, allyl methacrylate, diallyl maleate, triallyl isocyanurate, trivinylbenzene, diallyl phthalate, N,N'-m-phenylene bismaleimide and the like. The amount of the crosslinking accelerator varies depending on the types of the crosslinking accelerator and the polyether binary copolymer, but is normally within the range from 0 to 100 parts by weight, based on 100 parts by weight of the electrolyte composition excluding the electrolyte solution (2) and the additive (3).

As the compound having silicon hydride, which is used for crosslinking the ethylenically unsaturated group, a compound having at least two silicon hydrides can be used. Particularly, a polysiloxane compound or a polysilane compound is preferable.

Examples of the catalyst for the hydrosilylation reaction include transition metals such as palladium and platinum or a compound or complex thereof. Furthermore, a peroxide, an amine and a phosphine can also be used. The most popular catalyst includes dichlorobis(acetonitrile)palladium(II), chlorotris(triphenylphosphine)rhodium(I) and chloroplatinic acid.

The additive (3) comprising the ether compound having ethylene oxide unit is preferably any of additives of the following formulas (iii) to (vii):

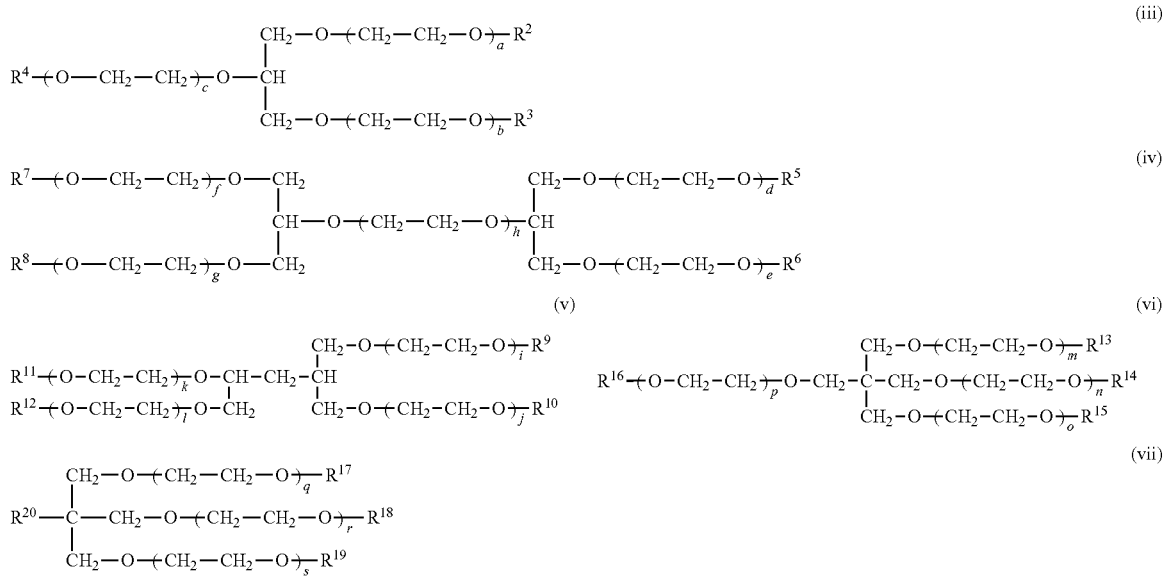

wherein $R^2$ to $R^{20}$ are an alkyl group having 1 to 6 carbon atoms, and a to s are the number of 0 to 12.

The amount of the additive (3) comprising the ether compound having ethylene oxide unit is arbitrary and varies depending on the type of the electrolyte solution (2), but is normally within the range from 0 to 1,000 parts by weight, preferably 0 to 500 parts by weight, based on 100 parts by weight of the electrolyte solution. If the amount is larger than 1,000 parts by weight, the ionic conductivity is decreased and the battery properties at low temperature are deteriorated.

The electrolyte salt compound (4) used in the present invention is preferably soluble in the mixture comprising the polyether binary copolymer (1), the electrolyte solution (2) and the additive (3). In the present invention, the following salt compounds are preferably used.

As the electrolyte solution (2) comprising the aprotic organic solvent, aprotic ethers and esters are preferable. Specific examples include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxazolidone, tetrahydrofuran, 2-methyltetrahydrofuran, 1,3-dioxolane, 4,4-methyl-1,3-dioxolane, tert-butyl ether, iso-butylether, 1,2-ethoxymethoxyethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ethylene diglyme, methyl tetraglyme, methyl triglyme, methyl diglyme, methyl formate, methyl acetate and methyl propionate. A mixture of two or more of them may be used. Particularly, ethylene carbonate, propylene carbonate, γ-butyrolactone, butylene carbonate, dimethyl carbonate, ethyl methyl carbonate, diethyl carbonate and 3-methyl-2-oxazolidone are preferable. Triethylene glycol dimethyl ether, triethylene glycol diethyl ether, tetraethylene glycol dimethyl ether and tetraethylene glycol diethyl ether are also a preferable electrolyte solution. The amount of the electrolyte solution varies depending on the type of the electrolyte solution, but is normally within the range from 100 to 10,000 parts by weight, based on 100 parts by weight of the polyether binary copolymer.

Since both of the polyether binary copolymer and the additive (3) comprising the ether compound having ethylene oxide unit have an ethylene oxide unit, these have good compatibility and good liquid retainability so that the leakage of the electrolyte solution (2) comprising the aprotic organic solvent can be prevented. The presence of the additive (3) in the electrolyte composition decreases the use amount of the electrolyte solution and decreases the vapor pressure to increase safety, thereby enabling to use the battery at higher temperature.

That is, examples thereof include a compound comprising a lithium ion as a cation, and an anion selected from chlorine ion, bromine ion, iodine ion, perchlorate ion, thiocyanate ion, tetrafluoroborate ion, nitrate ion, $AsF_6-$, $PF_6-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X_1SO_3-$, $[(X_1SO_2)(X_2SO_2)N]^-$, $[(X_1SO_2)(X_2SO_2)(X_3SO_2)C]^-$ and $[(X_1SO_2)(X_2SO_2)YC]^-$, wherein $X_1$, $X_2$, $X_3$ and Y respectively represent an electron attractive group. Preferably, $X_1$, $X_2$ and $X_3$ independently represent a perfluoroalkyl group having 1 to 6 carbon atoms or perfluoroaryl group having 6 to 18 carbon atoms and Y represents a nitro group, a nitroso group, a carbonyl group, a carboxyl group or a cyano group. $X_1$, $X_2$ and $X_3$ may be the same or different.

In the present invention, the amount of the electrolyte salt compound (4) is preferably 1 to 100 parts by weight, preferably 3 to 50 parts by weight, based on 100 parts by weight of the mixture of the polyether binary copolymer and electrolyte solution (2) or the mixture of the polyether binary copolymer, the electrolyte solution (2) and the additive (3). When this amount is at most 100 parts by weight, the processability and moldability, and the mechanical strength and flexibility of the resulting electrolyte are high, and, furthermore, the ionic conductivity is also high.

The flame retardance is required when using the electrolyte composition, a flame retardant can be used. An effective amount of those selected from halide (e.g. brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate are added.

The method for production of the electrolyte composition of the present invention is not specifically limited, and, usually, the respective components may be mechanically mixed. The electrolyte composition can be prepared by the method wherein the respective components are mechanically mixed and then crosslinked. After crosslinking, the crosslinked binary copolymer may be impregnated by immersing in a mixture of the electrolyte solution (2), the electrolyte salt compound (4) and optionally the additive (3) for a long time.

When the radical initiator is used for the crosslinking, the crosslinking reaction is completed at the temperature of 10° C. to 200° C. for 1 minute to 20 hours.

When using energy ray such as ultraviolet ray, a sensitizer is normally used. The crosslinking reaction is normally completed at the temperature of 10° C. to 150° C. for 0.1 seconds to 1 hour. In case of the crosslinking agent having silicon hydride, the crosslinking reaction is completed at the temperature of 10° C. to 180° C. for 10 minutes to 10 hours.

The method of preparing the battery is not specifically limited, but examples thereof include a method of immersing a separator with the mixture of the polyether binary copolymer, the electrolyte solution (2), the additive (3), the electrolyte salt compound (4) and the radical initiator, and optionally the crosslinking accelerator, then the crosslinking is made and the resultant is sandwiched between positive and negative electrodes; and a method wherein a battery structure comprising a positive electrode, a separator and a negative electrode is previously prepared, the above-mentioned mixture is poured into the battery structure and then the crosslinking is conducted.

The crosslinked polymer electrolyte according to the present invention is superior in mechanical strength and flexibility so that a large area thin-film electrolyte can be easily obtained by utilizing the properties. For example, it is possible to make a battery using the polymer electrolyte of the present invention. In this case, examples of the positive electrode material include lithium-manganese double oxide, lithium cobaltate, lithium nickelate, vanadium pentaoxide, olvin-type iron phosphate, polyacetylene, polypyrene, polyaniline, polyphenylene, polyphenylene sulfide, polyphenylene oxide, polypyrrole, polyfuran and polyazulene. Examples of the negative electrode material include an interlaminar compound prepared by occlusion of lithium between carbon materials such as graphite, hard carbon and soft carbon, a lithium metal and a lithium-lead alloy.

The crosslinked polymer electrolyte composition can also be used as a diaphragm of an ion electrode of cation such as alkaline metal ion, Cu ion, Ca ion and Mg ion with taking advantage of high electrical conductivity. The crosslinked polymer electrolyte composition of the present invention is suitable as a material for an electrochemical device, for example, a battery (e.g., a lithium battery), a capacitor and a sensor.

PREFERRED EMBODIMENTS OF THE INVENTION

The following Examples further illustrate the present invention.

The composition in terms of monomer of the polyether copolymer was determined by $^1$H NMR spectrum. In case of the measurement of the molecular weight of the polyether copolymer, a gel permeation chromatography measurement was conducted and the molecular weight was calculated in terms of standard polystyrene. The gel permeation chromatography measurement was conducted at 60° C. by a measuring device RID-6A manufactured by Shimadzu Corp., using a column manufactured by Showa Denko K.K. such as Showdex KD-807, KD-806, KD-806M and KD-803, and dimethylformamide (DMF) as a solvent. The glass transition temperature was measured by DSC 220 manufactured by Seiko Denshi Industry Co., Ltd. and the fusion heat was measured by a differential scanning calorimeter DSC 7 manufactured by PerkinElmer, Inc., both measurements being in a nitrogen atmosphere within the temperature range from −100 to 80° C. at a heating rate of 10° C./min. The ionic conductivity was measured at 30° C. with the film sandwiched between stainless steel (SUS steel) electrodes, and the conductivity was calculated according to the complex impedance method, using an A.C. method (voltage: 30 mV, frequency: 10 Hz to 10 MHz). A separator used for the production of the crosslinked polymer electrolyte battery was E16 (thickness: 16 micrometers, porosity: 43%) manufactured by Tonen Chemical Corp.

PREPARATION EXAMPLE

Production of Catalyst

Tributyltin chloride (10 g) and tributyl phosphate (35 g) were charged in a three-necked flask equipped with a stirrer, a thermometer and a distillation device, and the mixture was heated at 250° C. for 20 minutes while stirring under a nitrogen stream and the distillate was distilled off to obtain a solid condensate as a residue product. In the following, this condensate was used as a polymerization catalyst.

POLYMERIZATION EXAMPLE 1

Preparation of Polymer

After the atmosphere in a four-necked glass flask (internal volume: 3 L) was replaced by nitrogen, the condensate (2 g) obtained in the above Preparation Example as a catalyst, glycidyl methacrylate (60 g) having a water content adjusted to not more than 10 ppm and n-hexane (1,000 g) as a solvent were charged in the flask. Ethylene oxide (195 g) was gradually added with monitoring the conversion of glycidyl methacrylate by gas chromatography. The polymerization reaction was terminated by using methanol. A polymer was isolated by decantation, dried at 40° C. under a normal pressure for 24 hours, and then dried at 45° C. under reduced pressure for 10 hours to give 207 g of the polymer. This copolymer had the glass transition temperature of −62° C., the weight-average molecular weight of 1,200,000 and the fusion heat of 65 J/g. $^1$H NMR spectrum analysis revealed that the composition in terms of monomer of this copolymer had ethylene oxide of 93 mol % and glycidyl methacrylate of 7 mol %.

POLYMERIZATION EXAMPLE 2

Preparation of Polymer

After the atmosphere in a four-necked glass flask (internal volume: 3 L) was replaced by nitrogen, the condensate (2 g) obtained in the above Preparation Example as a catalyst, glycidyl acrylate (30 g) having a water content adjusted to not more than 10 ppm, n-hexane (1,000 g) as a solvent and ethylene glycol monomethyl ether (0.1 g) as a chain transfer agent were charged in the flask. Ethylene oxide (195 g) was gradually added with monitoring the conversion of glycidyl acrylate by gas chromatography. The polymerization reaction was terminated by using methanol. A polymer was isolated by decantation, dried at 40° C. under a normal pressure for 24 hours, and then dried at 45° C. under reduced pressure for 10 hours to give 201 g of the polymer. This copolymer had the glass transition temperature of −61° C., the weight-average molecular weight of 200,000 and the fusion heat of 78 J/g. $^1$H NMR spectrum analysis revealed that the composition in terms of monomer of this copolymer had ethylene oxide of 96 mol % and glycidyl acrylate of 4 mol %.

POLYMERIZATION EXAMPLE 3

Preparation of Polymer

After the atmosphere in a four-necked glass flask (internal volume: 3 L) was replaced by nitrogen, the condensate (2 g) obtained in the above Preparation Example as a catalyst, glycidyl acrylate (30 g) having a water content adjusted to not more than 10 ppm, ethylene glycol monomethyl ether (15 g) as a chain transfer agent and n-hexane (1,000 g) as a solvent were charged in the flask. Ethylene oxide (195 g) was gradually added with monitoring the polymerization degree of glycidyl acrylate by gas chromatography. The polymerization reaction was terminated by using methanol. A polymer was isolated by decantation, dried at 40° C. under a normal pressure for 24 hours, and then dried at 45° C. under reduced pressure for 10 hours to give 197 g of the polymer. This copolymer had the glass transition temperature of −62° C., the weight-average molecular weight of 6,500 and the fusion heat of 69 J/g. $^1$H NMR spectrum analysis revealed that the composition in terms of monomer of this copolymer had ethylene oxide of 95 mol % and glycidyl acrylate of 5 mol %.

EXAMPLE 1

1 g of the binary copolymer obtained in Polymerization Example 1, 10 g of ethylene carbonate, 10 g of γ-butyrolactone, 0.05 g of benzoyl peroxide as a radical initiator and 2 g of LiBF$_4$ were homogeneously mixed to give a mixture liquid. This mixture liquid was coated on a separator with a double-sided coater and impregnated into a separator, and was kept at 90° C. for 10 hours to produce a crosslinked polymer electrolyte composition having the thickness of 40 micrometers. The ionic conductivity of the electrolyte composition was 8.3×10$^{-4}$ S/cm at 30° C., which was higher than that obtained in Comparative Example 1.

EXAMPLE 2

1 g of the binary copolymer obtained in Polymerization Example 2, 10 g of ethylene carbonate, 10 g of propylene carbonate, 10 g of an additive containing an ether compound having ethylene oxide units of the following formula (viii), 0.05 g of benzoyl peroxide as a radical initiator and 0.1 g of N,N'-m-phenylene bismaleimide as a radical accelerator, and 2 g of lithium perchlorate were homogeneously mixed to give a mixture liquid. This mixture liquid was coated on a separator with a double-sided coater and impregnated into a separator, and was kept at 90° C. for 10 hours to produce a crosslinked polymer electrolyte composition having the thickness of 40 micrometers. The ionic conductivity of the electrolyte composition was 1.1×10$^{-3}$ S/cm at 30° C., which was higher than that obtained in Comparative Example 1.

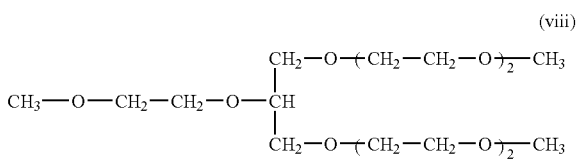

COMPARATIVE EXAMPLE 1

1 g of the binary copolymer obtained in Polymerization Example 3, 10 g of ethylene carbonate, 10 g of propylene carbonate, 0.05 g of benzoyl peroxide as a radical initiator and 2 g of LiBF$_4$ were homogeneously mixed to give a mixture liquid. This mixture liquid was coated on a separator with a double-sided coater and impregnated into a separator E16, and was kept at 90° C. for 10 hours. The crosslinking, however, was not caused. Accordingly, the crosslinking was conducted by using half amounts of ethylene carbonate and propylene carbonate. The resultant crosslinked material, however, had poor liquid retainability and poor processability, and an electrolyte solution exuded out.

Preparation Example of Positive Electrode 90 g of lithium cobaltate, 4 g of acetylene black, 6 g of polyvinylidene fluoride and 100 g of dimethyl formamide were mixed by a disper and coated on an aluminum foil (thickness: 25 micrometers). The solvent was removed by the drying under reduced pressure. The mixture was pressed by two rolls, dried under reduced pressure, and maintained in a glove box under an argon environment.

Preparation Example of Negative Electrode 90 g of graphite powder and 10 g of polyvinylidene fluoride were dissolved and dispersed in 80 g of N-methyl pyrrolidone to produce a negative electrode active substance slurry. The negative electrode active substance slurry was coated on a surface of a copper foil, dried and pressed by two rolls to produce a negative electrode.

Battery Test

EXAMPLE 3

A battery was assembled in a glove box under argon atmosphere by using the crosslinked polymer electrolyte composition having the separator obtained in Example 1, and positive and negative electrodes prepared by impregnating both of the positive electrode prepared in Preparation Example of Positive Electrode and the negative electrode prepared in Preparation Example of Negative Electrode with the mixture liquid obtained in Example 1 and conducting the thermal crosslinking. The assembled cell was kept in a constant temperature bath at 20° C. for 12 hours, and the charge/discharge properties of the battery were examined. After the charge was conducted at a constant electrical current and a constant electrical voltage of 4.2 V at 60° C., the discharge to 3 V was conducted at a constant electrical current. When the battery was tested at 0.2 C, the first discharge gave the discharge capacity of 142 mAh/g on the basis of lithium cobaltate.

EXAMPLE 4

A battery was assembled in a glove box under argon atmosphere by using the crosslinked polymer electrolyte composition having the separator obtained in Example 2, and positive and negative electrodes prepared by impregnating both of the positive electrode prepared in Preparation Example of Positive Electrode and the negative electrode prepared in Preparation Example of Negative Electrode with the mixture liquid obtained in Example 2 and conducting the thermal crosslinking. The assembled cell was kept in a constant temperature bath at 20° C. for 12 hours, and charge/discharge properties of the battery were examined. After the charge was conducted at a constant electrical current and a constant electrical voltage of 4.2 V at 60° C., the discharge to 3 V was conducted at a constant electrical current. When the battery was tested at 0.2 C, the first discharge gave the discharge capacity of 102 mAh/g on the basis of lithium cobaltate.

EXAMPLE 5

A separator, the positive electrode prepared in Preparation Example of Positive Electrode and the negative electrode prepared in Preparation Example of Negative Electrode were laminated and an aluminum laminate was heat-sealed in three directions with leaving a port of injecting a liquid. After injecting, form the port, a mixture liquid prepared by homogeneously mixing 1 g of the binary copolymer obtained in Polymerization Example 1, 10 g of propylene carbonate, 10 g of γ-butyrolactone, 0.05 g of benzoyl peroxide as a radical initiator and 2 g of lithium perchlorate, the degassing was conducted for 30 minutes under reduced pressure, the open port was closed by heat seal. Then the crosslinking reaction was conducted at 90° C. for 10 hours. The assemble work of the battery was conducted in a glove box under an argon gas atmosphere. The assembled cell was kept in a constant temperature bath at 20° C. for 12 hours, and the charge/discharge properties of the battery were examined. After the charge was conducted at a constant electrical current and a constant electrical voltage of 4.2 V at 60° C., the discharge to 3 V was conducted at a constant electrical current. When the battery was tested at 0.2 C, the first discharge gave the discharge capacity of 144 mAh/g on the basis of lithium cobaltate.

Effect of the Invention

The crosslinked polymer electrolyte of the present invention is excellent in heat resistance and particularly its battery properties at high temperature are remarkably improved. It can be applied to batteries and electronic apparatuses such as a large-capacity condenser and a display device (e.g., an electrochromic display) and as an antistatic agent for plastics.

The invention claimed is:

1. A polymer electrolyte composition comprising:
  (1) a crosslinked material of a polyether binary copolymer which has a main chain consisting of repeating units of the formula (i) and crosslinking units of the formula (ii) and which has a weight-average molecular weight of $10^4$ to $10^7$,

wherein $R^1$ is an ethylenically unsaturated group having an ester linkage,
  (2) an electrolyte solution comprising an aprotic organic solvent,
  (3) an additive, as an optical ingredient, which comprises an ether compound having an ethylene oxide unit, and
  (4) an electrolyte salt compound comprising a lithium salt compound,
  wherein the amount of the electrolyte solution is within the range of 100 to 10,000 parts by weight, based on 100 parts by weight of the polyether binary copolymer.

2. The polymer electrolyte composition according to claim 1, wherein the repeating units of the formula (ii) is crosslinkable component derived from glycidyl acrylate or glycidyl methacrylate.

3. A battery comprising the polymer electrolyte composition according to claim 2, a positive electrode and a negative electrode.

4. The polymer electrolyte composition according to claim 1, wherein the weight-average molecular weight of the polyether binary copolymer is within the rage from $10^5$ to $5 \times 10^6$.

5. A battery comprising the polymer electrolyte composition according to claim 4, a positive electrode and a negative electrode.

6. The polymer electrolyte composition according to claim 1, which comprises 80 to 99.5 mol % of the units of the formula (i) and 0.5 to 20 mol % of the units of the formula (ii).

7. A battery comprising the polymer electrolyte composition according to claim 6, a positive electrode and a negative electrode.

8. A battery comprising the polymer electrolyte composition according to claim 1, a positive electrode and a negative electrode.

* * * * *